(12) United States Patent
Kawano et al.

(10) Patent No.: US 10,333,292 B2
(45) Date of Patent: Jun. 25, 2019

(54) SWITCHING REGULATOR

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: ABLIC INC., Chiba-Shi (JP)

(*) Notice: Subject to any disclaimer, the term of this patent is extended or adjusted under 35 U.S.C. 154(b) by 163 days.

(21) Appl. No.: 15/454,011

(22) Filed: Mar. 9, 2017

(65) Prior Publication Data
US 2017/0264092 A1 Sep. 14, 2017

(30) Foreign Application Priority Data

Mar. 10, 2016 (JP) .................. 2016-047096

(51) Int. Cl.
H02H 7/12 (2006.01)
H02M 3/156 (2006.01)
H02M 1/32 (2007.01)

(52) U.S. Cl.
CPC .......... *H02H 7/1213* (2013.01); *H02M 3/156* (2013.01); *H02M 2001/327* (2013.01)

(58) Field of Classification Search
CPC ............... H02H 3/08; H02H 3/20; H02H 9/02
USPC .................................... 361/18, 103
See application file for complete search history.

(56) References Cited

U.S. PATENT DOCUMENTS

2016/0265501 A1* 9/2016 Miyazawa ............ F02P 3/0552

FOREIGN PATENT DOCUMENTS

JP H06-244414 A 9/1994

* cited by examiner

*Primary Examiner* — Dharti H Patel
(74) *Attorney, Agent, or Firm* — Brinks Gilson & Lione

(57) ABSTRACT

To provide a switching regulator equipped with an overheat protection circuit small in current consumption. A switching regulator of the present invention is configured to intermittently operate an overheat protection circuit only for a prescribed period based on a signal turning on a switching element, which is outputted from an output control circuit.

4 Claims, 9 Drawing Sheets

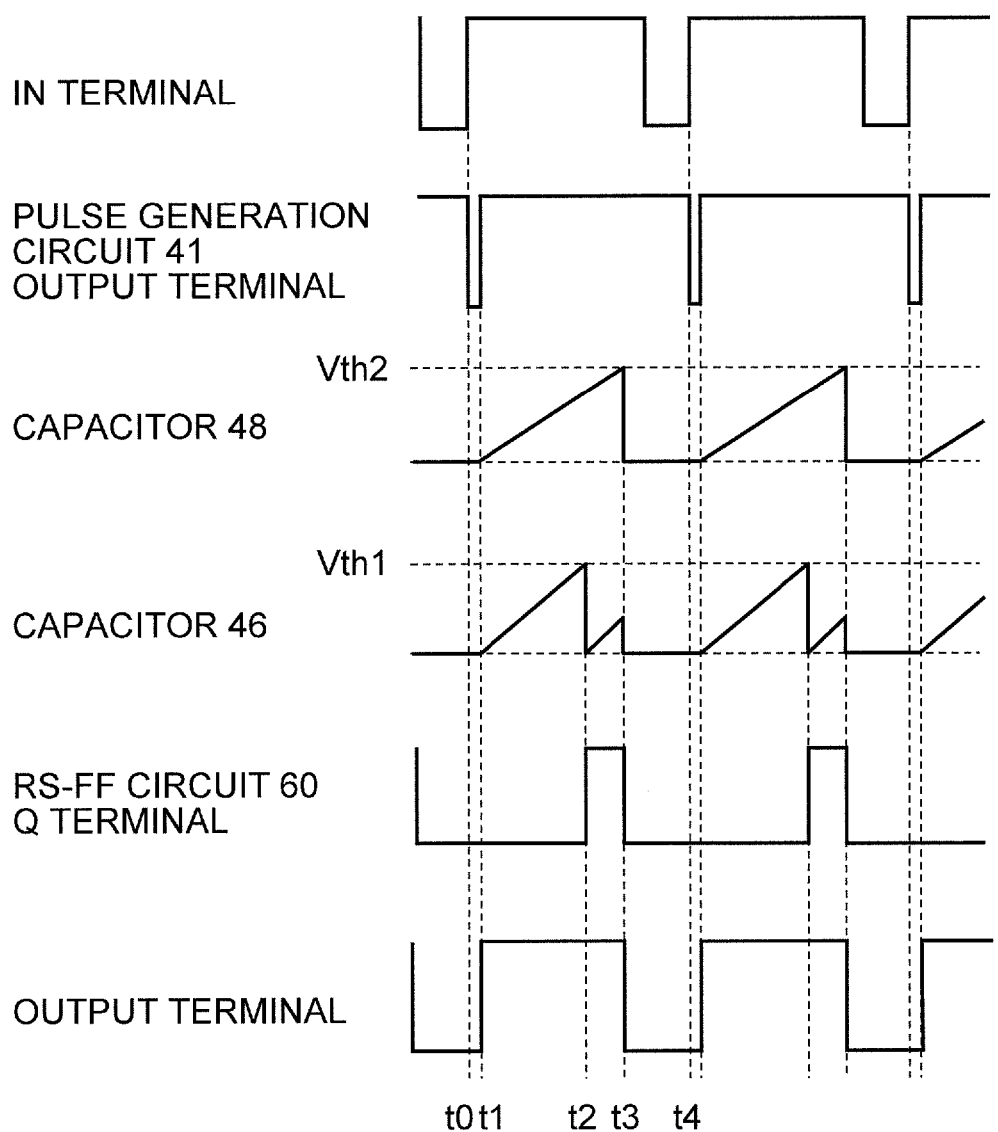

SWITCHING REGULATOR

RELATED APPLICATIONS

This application claims priority under 35 U.S.C. § 119 to Japanese Patent Application No. 2016-047096 filed on Mar. 10, 2016, the entire content of which is hereby incorporated by reference.

BACKGROUND OF THE INVENTION

Field of the Invention

The present invention relates to a switching regulator which outputs a constant voltage, and more specifically to a switching regulator equipped with an overheat protection circuit which detects a temperature to stop a switching operation.

Background Art

Low power consumption has recently been progressing in an electronic device equipped with a battery. The low power consumption of the electronic device has been further strongly required to make a battery driving time longer particularly in a smart phone, a portable device, a wearable device, etc. Therefore, a reduction request for power consumption is remarkable even in a semiconductor integrated circuit built in the electronic device.

On the other hand, such safety as not to exert adverse effects such as an explosion, an electric shock, etc., on a human body is particularly required for the above electronic device directly handled by a person. For example, as a switching regulator built in a battery-driven electronic device and using a battery voltage as an input voltage, there has been known one equipped with an overheat protection circuit which stops its operation when a chip temperature in a semiconductor integrated circuit rises and reaches a temperature not less than a prescribed temperature.

[Patent Document 1] Japanese Patent Application Laid-Open No. Hei 06(1994)-244414

However, when a protection circuit for ensuring the safety is added, power for operating the protection circuit is required.

SUMMARY OF THE INVENTION

The present invention provides a method of intermittently operating an overheat protection circuit to thereby realize a reduction in power consumption and at the same time reliably protect a switching regulator.

In order to solve the related art problems, a switching regulator of the present invention is configured as follows.

The switching regulator is configured to be equipped with an error comparator which monitors an output voltage, an output control circuit which outputs a control signal to a gate of a switching element, based on an output signal of the error comparator, and an overheat protection circuit which, when a prescribed temperature or more is reached, outputs a signal to the output control circuit to turn off the switching element and to cause the overheat protection circuit to be inputted with a signal based on the output signal of the output control circuit and perform an intermittent operation in which the overheat protection circuit acts only for a prescribed period.

A switching regulator of the present invention has an effect of being capable of reducing current consumption of an overheat protection circuit particularly at a light load since a switching regulator is configured to intermittently operate the overheat protection circuit only for a prescribed period based on a signal turning on a switching element, which is outputted from an output control circuit.

BRIEF DESCRIPTION OF THE DRAWINGS

FIG. 7 is a timing chart illustrating a third operation example of the timer circuit in the first embodiment;

DETAILED DESCRIPTION OF THE PREFERRED EMBODIMENTS

Figure 1:
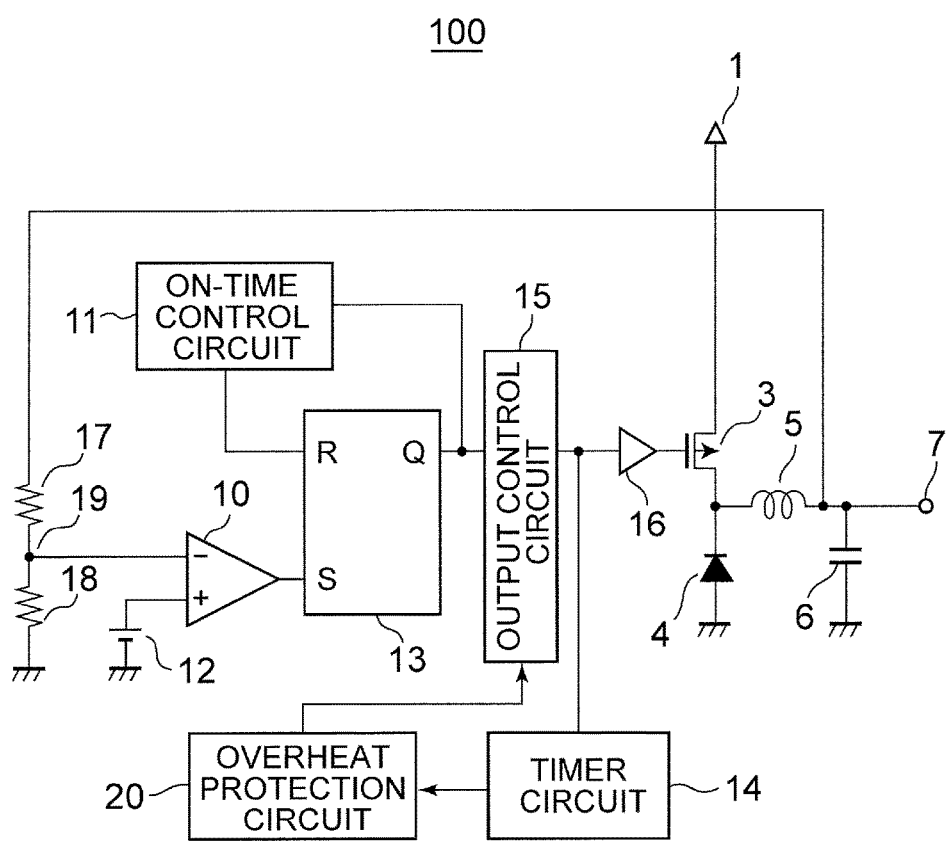
FIG. 1 is a circuit diagram illustrating one example of a switching regulator according to a first embodiment of the present invention.

FIG. 1 is a circuit diagram illustrating one example of a switching regulator according to a first embodiment. A circuit in FIG. 1 is an asynchronous rectification-type switching regulator 100 which converts an input voltage Vin inputted to a power supply terminal 1 into a constant voltage and outputs the same to an output terminal 7 as an output voltage Vout.

The switching regulator 100 according to the present embodiment is equipped with a PMOS transistor 3 being a switching element, a diode 4, an inductor 5, an output capacitor 6, an error comparator 10, an on-time control circuit 11, a reference voltage circuit 12, an RS-FF circuit 13, a timer circuit 14, an output control circuit 15, a buffer circuit 16, voltage division resistors 17 and 18, and an overheat protection circuit 20.

The voltage division resistors 17 and 18 output a feedback voltage VFB corresponding to the output voltage Vout from a feedback terminal 19. The reference voltage circuit 12 outputs a reference voltage VREF. The error comparator 10 compares the feedback voltage VFB and the reference voltage VREF and outputs a set signal to the RS-FF circuit 13 when the feedback voltage VFB drops to the reference voltage VREF or less. The on-time control circuit 11 outputs a reset signal to the RS-FF circuit 13, based on an output signal of an output terminal Q of the RS-FF circuit 13. The RS-FF circuit 13 outputs the output signal from the output terminal Q in accordance with the set signal supplied to its set terminal S and the reset signal supplied to its reset terminal R. In response to the signal of the RS-FF circuit 13, the output control circuit 15 controls the PMOS transistor 3 through the buffer circuit 16 to generate the output voltage Vout.

The overheat protection circuit 20 monitors the temperature of the switching regulator and outputs a signal to the output control circuit 15 when the switching regulator generates heat and is determined to be an overheat state. In the switching regulator, the PMOS transistor 3 which supplies the output voltage and current to the output terminal 7 becomes the highest in temperature. Thus, the output control circuit 15 which has received the signal of the overheat protection circuit 20 turns off the PMOS transistor 3 through the buffer circuit 16 to thereby protect the switching regulator from overheating.

When the PMOS transistor 3 is turned on in response to the signal outputted from the output control circuit 15, the timer circuit 14 outputs a signal which starts the operation of the overheat protection circuit 20 and zeroes or reduces current consumption of the overheat protection circuit 20 after the lapse of a prescribed time (called a count time).

Figure 2:
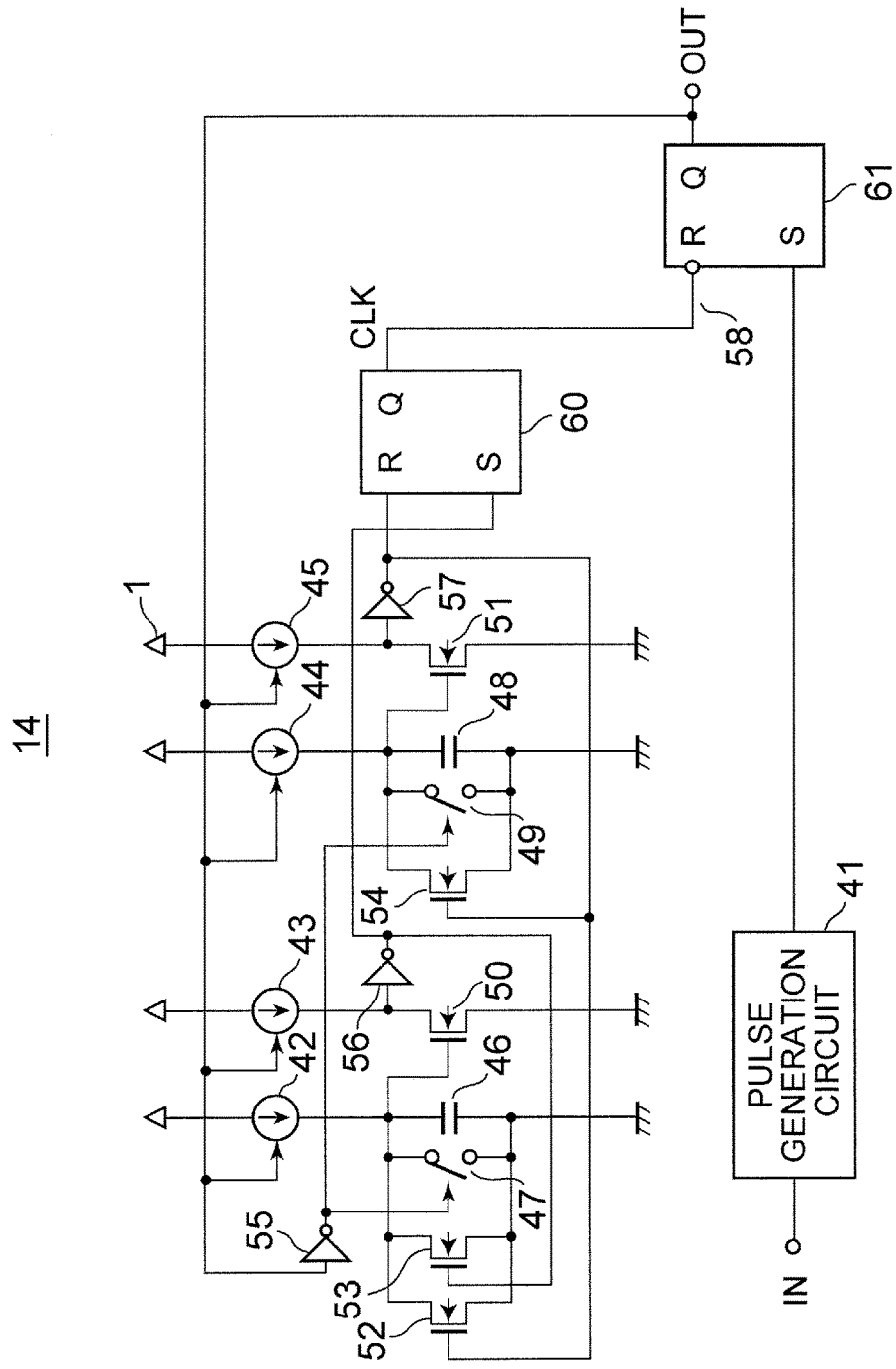
FIG. 2 is a diagram illustrating a circuit example of a timer circuit in the first embodiment.

FIG. 2 is a circuit diagram illustrating one example of the timer circuit 14 in the first embodiment.

When a signal of the output control circuit 15 inputted to an IN terminal becomes an L level, a pulse generation circuit 41 outputs an L signal of a prescribed period. An RS-FF circuit 61 outputs an H signal from an output terminal Q thereof when the signal of the pulse generation circuit 41 is brought into an H level. Bias circuits 42, 43, 44, and 45 are turned on in response to the H signal of the RS-FF circuit 61. A capacitor 46 is connected to the output of the bias circuit 42 and charged by a current of the bias circuit 42. A capacitor 48 is connected to the output of the bias circuit 44 and charged by a current of the bias circuit 44.

Here, for example, the capacitor 48 has a capacity larger than that of the capacitor 46 and is set in such a manner that a charging time taken until reaching a prescribed voltage becomes longer than that of the capacitor 46. The NMOS transistor 50 is turned on when the charging voltage of the capacitor 46 reaches a threshold voltage thereof or more. An NMOS transistor 51 is turned on when the charging voltage of the capacitor 48 reaches a threshold voltage thereof or more.

An inverter 56 outputs a signal obtained by inverting an H/L signal of an output of the NMOS transistor 50 to a set terminal S of an RS-FF circuit 60 and a gate of an NMOS transistor 53. An inverter 57 outputs a signal obtained by inverting the H/L signal of an output of the NMOS transistor 51 to a reset terminal R of the RS-FF circuit 60 and gates of NMOS transistors 52 and 54.

The NMOS transistors 52 and 53 are connected in parallel with the capacitor 46 and turned on when an H signal is inputted to the gates thereof, to discharge the electric charge of the capacitor 46. The NMOS transistor 54 is connected in parallel with the capacitor 48 and turned on when the H signal is inputted to the gate thereof, to discharge the electric charge of the capacitor 48. Switches 47 and 49 are turned off in response to a Q signal outputted from the RS-FF circuit 61 to control the capacitors 46 and 48 to be charged.

The RS-FF circuit 60 outputs a signal from a Q terminal thereof, based on the signals inputted to the above set terminal S and reset terminal R to generate a clock signal CLK. The RS-FF circuit 61 is inputted with the output signal of the pulse generation circuit 41 at its set terminal S and inputted with the clock signal CLK outputted from the RS-FF circuit 60 at its reset terminal R, and outputs a signal from its output terminal Q.

Figure 3:
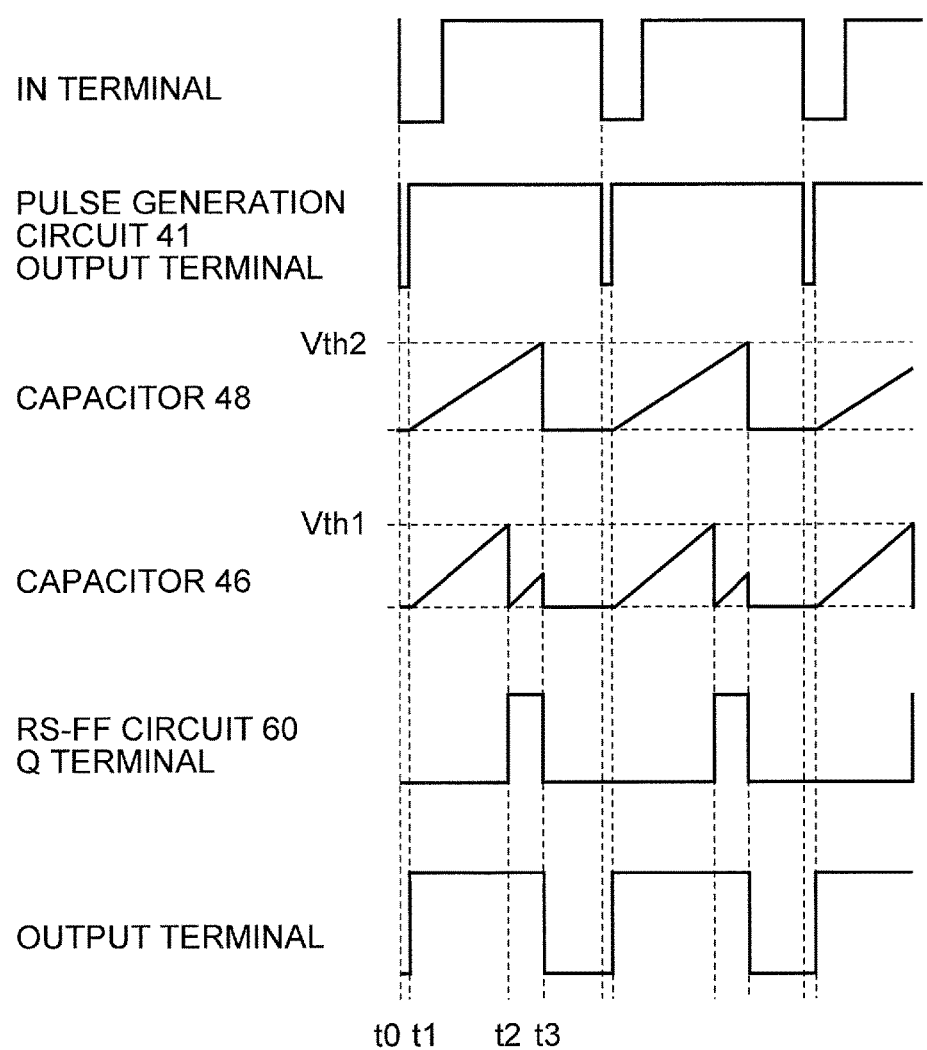
FIG. 3 is a timing chart illustrating an operation example of the timer circuit in the first embodiment.

The operation of the timer circuit 14 will next be described on the basis of a timing chart illustrating an operation example of the timer circuit 14 in the first embodiment in FIG. 3.

When the output signal of the output control circuit 15 inputted to the IN terminal of the timer circuit 14 is brought to an L level at a time t0, the pulse generation circuit 41 outputs an L signal pulse for a prescribed short period determined by its internal delay circuit. At this time, the capacitors 46 and 48 are discharged and their charging voltages are at L.

Since the signal of the pulse generation circuit 41 is brought to an H level at a time t1, an H signal is outputted from the output terminal Q of the RS-FF circuit 61. Since the switches 47 and 49 are turned off and the bias circuits 42, 43, 44, and 45 are turned on, the capacitors 46 and 48 start charging.

At a time t2, when the charging voltage of the capacitor 46 is raised by a current supplied from the bias circuit 42 and reaches a threshold voltage Vth1 of the NMOS transistor 50, the NMOS transistor 50 is turned on. Thus, since the H signal outputted from the inverter 56 is inputted to the set terminal S of the RS-FF circuit 60, the RS-FF circuit 60 outputs the H signal from the output terminal Q thereof. The H signal outputted from the inverter 56 turns on the NMOS transistor 53 to discharge the capacitor 46. At this time, the charging voltage of the capacitor 48 larger in capacitance value than the capacitor 46 does not reach a threshold voltage Vth2 of the NMOS transistor 51 and hence the capacitor 48 continues charging.

At a time t3, when the charging voltage of the capacitor 48 reaches the threshold voltage Vth2 of the NMOS transistor 51, the NMOS transistor 51 is turned on. Thus, since the RS-FF circuit 60 is inputted with the H signal outputted from the inverter 57 at the reset terminal R thereof, the RS-FF circuit 60 outputs an L signal from the output terminal Q thereof. The H signal outputted from the inverter 57 turns on the NMOS transistors 52 and 54 to discharge the capacitors 46 and 48. At this time, since the NMOS transistor 50 is off, the RS-FF circuit 60 is inputted with the L signal through the inverter 56 at the set terminal S thereof. Therefore, the RS-FF circuit 60 outputs the L signal from the output terminal Q thereof. Thus, since the RS-FF circuit 61 is inputted with the L signal at the reset terminal R thereof, the RS-FF circuit 61 outputs the L signal from the output terminal Q thereof.

Such operation as described above is repeated to cause the timer circuit 14 to intermittently operate the overheat protection circuit 20.

Incidentally, the timer circuit 14 may be a configuration to start a time count simultaneously with the outputting of the H signal with the turning-on of the PMOS transistor 3 as the trigger and output the L signal after the lapse of the prescribed time. The timer circuit 14 is not limited to the present circuit example. The timer circuit 14 may be equipped with, for example, a pulse generation circuit which generates a one-shot pulse in response to the signal of the inverter 54.

Further, an intermittent output or a constant output can be selected according to the situation by adjusting the relation between a count time and a switching cycle.

Figure 4:
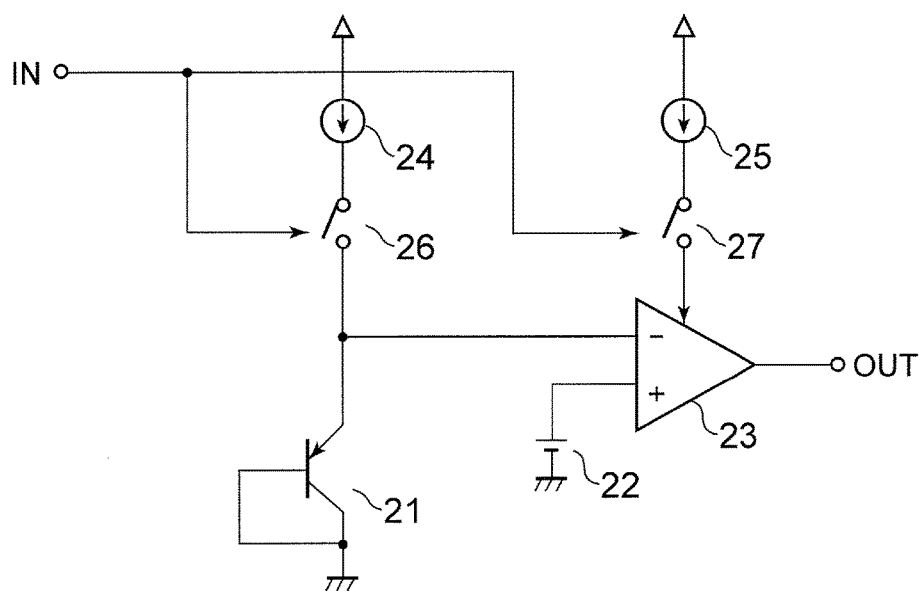
FIG. 4 is a diagram illustrating a circuit example of an overheat protection circuit in the first embodiment.

FIG. 4 is a circuit diagram illustrating one example of the overheat protection circuit of the present invention. The overheat protection circuit 20 is equipped with a thermosensitive element 21, a reference voltage circuit 22, a comparator 23 which compares a voltage of the thermosensitive element 21 and an output voltage of the reference voltage circuit 22 to perform temperature detection, a bias circuit 24 which supplies a current to the thermosensitive element 21, a bias circuit 25 which supplies a current to the comparator 23, a switch 26 which controls the supply of the current from the bias circuit 24 to the thermosensitive element 21, and a switch 27 which controls the supply of the current from the bias circuit 25 to the comparator 23. The switch 26 is provided between the thermosensitive element 21 and the bias circuit 24. The switch 27 is provided between the comparator 23 and the bias circuit 25.

When the PMOS transistor 3 is turned on in response to the signal outputted from the output control circuit 15, the overheat protection circuit 20 simultaneously receives the H signal from the timer circuit 14 on the basis of the same signal, so that the switches 26 and 27 are turned on to supply the current to the thermosensitive element 21 and the comparator 23. After the current is supplied and the comparator 23 is stabilized to a state of being comparable with the voltage of the thermosensitive element 21, the comparator 23 compares the output voltage of the reference voltage circuit 22 and the voltage of the thermosensitive element 21 to thereby perform a temperature determination. When the temperature determination is made to be an overheat state, the bias circuits 24 and 25 respectively continue the supply of the current to the thermosensitive element 21 and the comparator 23 to continue temperature detection. When the temperature determination is made not to be the overheat state, the switches 26 and 27 are turned off after a prescribed time since the turning on of the PMOS transistor 3, so that the supply of the current to the thermosensitive element 21 and the comparator 23 is stopped.

A bipolar element used in a bandgap reference circuit may also be used as the thermosensitive element. Since a forward voltage Vf of the bipolar element used in the bandgap reference circuit changes according to the temperature, the forward voltage Vf is compared with the reference voltage of the reference voltage circuit 22, which is adjusted so as not to change by the temperature, by the comparator 23 to thereby enable temperature detection.

Figure 5A:
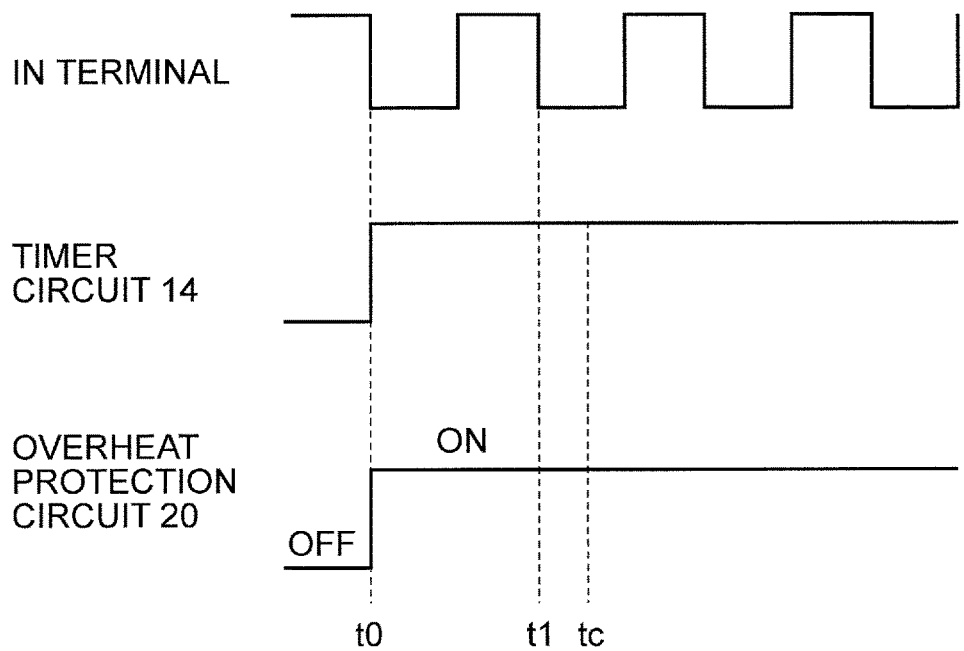
FIG. 5A is a timing chart illustrating a continuous mode operating state in a first operation example of the switching regulator according to the first embodiment.
Figure 5B:
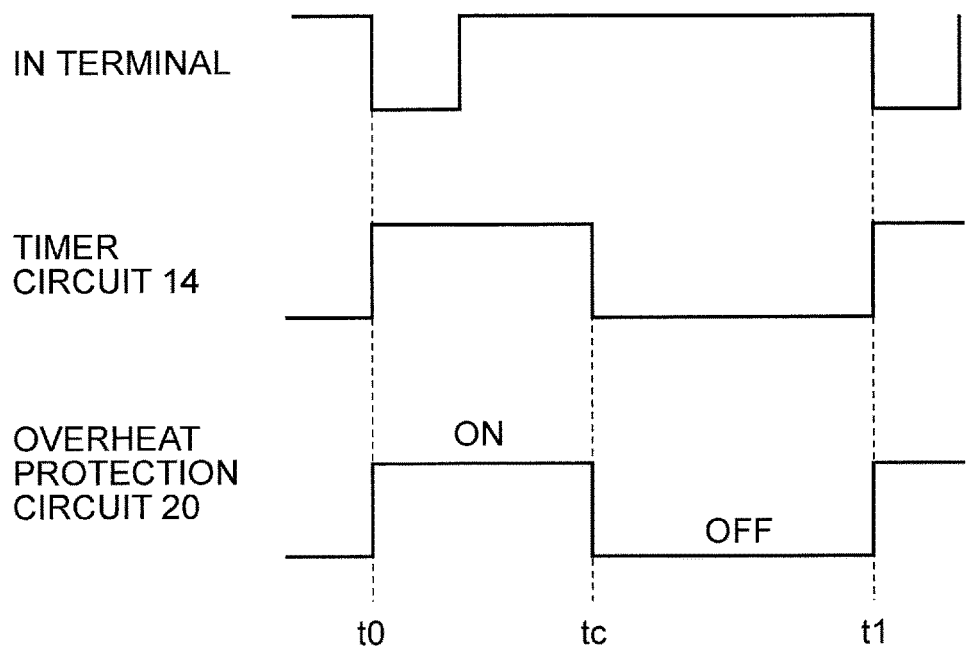
FIG. 5B is a timing chart illustrating a discontinuous mode operating state in the first operation example of the switching regulator according to the first embodiment.

FIG. 5 is a timing chart illustrating a first operation example of the switching regulator according to the first embodiment. Further, FIG. 5A is a timing chart of operating states of the PMOS transistor 3, the timer circuit 14, and the overheat protection circuit 20 where a heavy load is connected to the output terminal 7, and FIG. 5B is a timing chart of operating states thereof where a light load is connected to the output terminal 7, respectively. In the first operation example of FIG. 5, the count time of the timer circuit 14 is set longer than the switching cycle.

In FIG. 5A, the switching regulator is in a continuous mode operating state in which the load connected to the output terminal 7 is heavy, and the PMOS transistor 3 performs an oscillation operation in a prescribed switching cycle.

First, at a time t0 when the PMOS transistor 3 is turned on, the timer circuit 14 is turned on to start the time count in response to the signal outputted from the output control circuit 15. Along with it, the timer circuit 14 causes the operation of the overheat protection circuit 20 to be turned on.

Since a prescribed count time is not reached from the time t0 to a time t1 after the switching cycle, the timer circuit 14 continues to turn on and causes the on operation of the overheat protection circuit 20 to continue. However, in response to the signal outputted from the output control circuit 15 again at the time t1, the time count is started anew from here.

Since the time count started from the time t1 is continued even though a time tc after a count time from the time t0 is reached, the timer circuit 14 continues to turn on and causes the on operation of the overheat protection circuit 20 to continue.

As described above, since the timer circuit 14 continues to turn on in the first operation example in which the count time of the timer circuit 14 is set longer than the switching cycle, the overheat protection circuit 20 does not reach an intermittent operating state and continues to always operate.

With the switches 26 and 27 being turned on along with the turning on of the PMOS transistor 3, the overheat protection circuit 20 starts a temperature detecting operation and outputs a signal to the output control circuit 15 when it is determined that the switching regulator generates heat and is in an overheat state. Then, the output control circuit 15 outputs a signal in response to the signal of the overheat protection circuit 20 to stop the PMOS transistor 3 through the buffer circuit 16, thereby suppressing heat generation.

In FIG. 5B in which the load becomes light, the switching regulator is transited to a discontinuous mode operating state in which a fluctuation in the output voltage Vout becomes small, and the operation of the PMOS transistor 3 does not assume an oscillation operation of a predetermined cycle, and the switching frequency in the discontinuous mode operating state is decreased. At this time, since the on time is fixed in the COT (Constant On Time)-controlled switching regulator which outputs the signal turned on for the fixed time, the off time becomes long due to the decrease in the switching frequency.

When the switching cycle becomes long and exceeds the count time of the timer circuit 14, a time tc reaching the count time comes earlier than a time t1 after the lapse of a time corresponding to the switching cycle from the time t0 as illustrated in FIG. 5B, the timer circuit 14 outputs a signal turning off the overheat protection circuit 20. In response to the signal, the overheat protection circuit 20 is turned off and turned on at the next time t1 with the turning on of the PMOS transistor 3 again. That is, the overheat protection circuit 20 operates intermittently. Thus, when the load becomes light and the frequency reaches a prescribed value or below, the overheat protection circuit 20 is intermittently operated, so that power consumption of the overheat protection circuit 20 can be reduced.

The first operation example of the first embodiment is capable of expecting an effect of while enhancing the safety of a semiconductor integrated circuit by always operating the overheat protection circuit 20 in the continuous mode operating state in which a rise in temperature is most apprehended, intermittently operating the overheat protection circuit 20 in the discontinuous mode operating state in which the frequency of a rise in temperature is low, and having also a reduction in power consumption.

A second operation example of the switching regulator according to the first embodiment is a case where the count time of the timer circuit 14 is set shorter than the switching cycle. In the second operation example, even in the case where the switching regulator is brought into a continuous mode operating state in which a heavy load is connected to the output terminal 7 and an oscillation operation is done in a prescribed switching cycle, the timer circuit 14 continues to repeatedly send a stop signal to the overheat protection circuit 20 for each count time unlike the first operation example. Therefore, the overheat protection circuit 20 is brought into an intermittent operating state, so that power consumption of the overheat protection circuit 20 can be reduced as compared with the first operation example.

On the other hand, even when the switching regulator is transited to the discontinuous mode operating state in which a light load is connected to the output terminal 7, a fluctuation in the output voltage Vout becomes small, and the operation of the PMOS transistor 3 does not assume the oscillation operation of the predetermined cycle, and the switching frequency in the discontinuous mode operating state is decreased, the overheat protection circuit 20 is intermittently operated in a manner similar to the first operation example.

The second operation example in the first embodiment is capable of expecting a power consumption reduction effect higher than that in the first operation example by intermittently operating the overheat protection circuit 20 in the continuous mode operating state/discontinuous mode operating state. Therefore, it can be said that this is an operation example preferable for the switching regulator in which in a continuous operation mode, no large current is required and an overheat state is not so much apprehended.

Figure 6A:
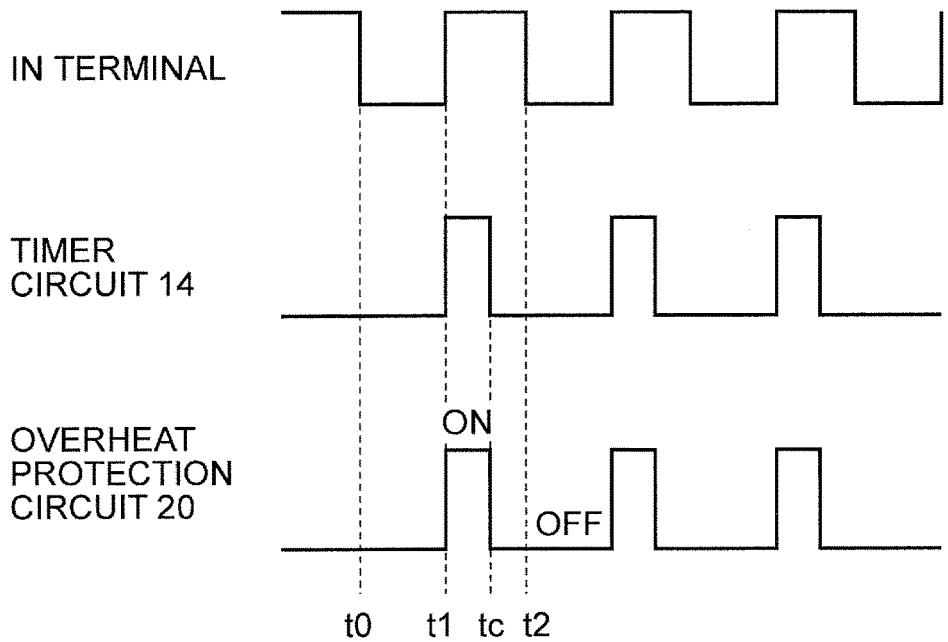
FIG. 6A is a timing chart illustrating a continuous mode operating state in a third operation example of the switching regulator according to the first embodiment.
Figure 6B:
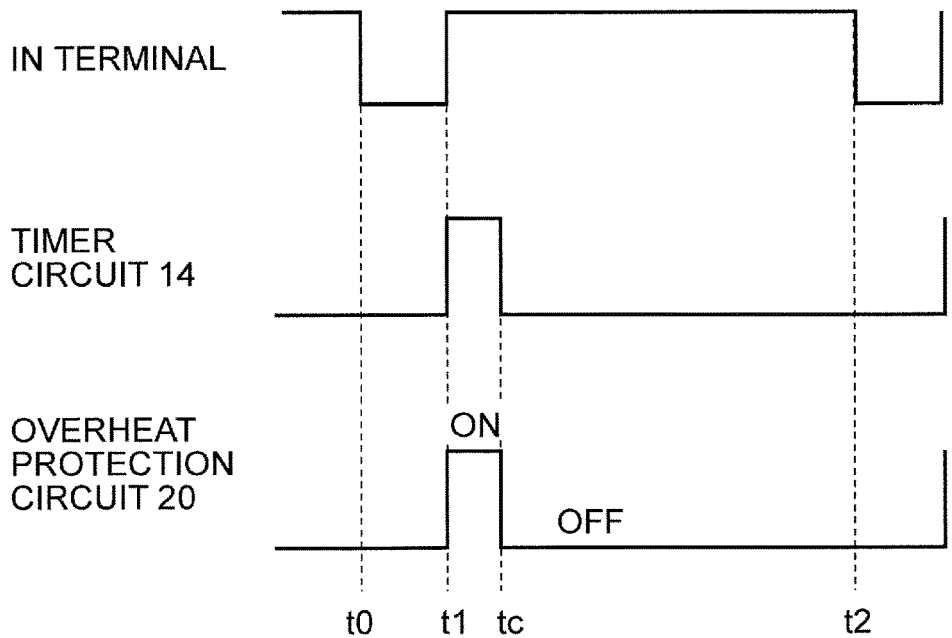
FIG. 6B is a timing chart illustrating a discontinuous mode operating state in the third operation example of the switching regulator according to the first embodiment.

FIG. 6 is a timing chart illustrating a third operation example of the switching regulator according to the first embodiment. In the present example, the time count of the timer circuit 14 is started simultaneously when the PMOS transistor 3 is turned off. Further, FIG. 6A is a timing chart of operating states of the PMOS transistor 3, the timer circuit 14, and the overheat protection circuit 20 where a heavy load is connected to the output terminal 7, and FIG. 6B is a timing chart of operating states thereof where a light load is connected thereto, respectively.

In FIG. 6A, the switching regulator is in a continuous mode operating state in which the load connected to the output terminal 7 is heavy, and the PMOS transistor 3 performs an oscillation operation in a prescribed switching cycle.

First, a signal outputted from the output control circuit 15 is inputted to the timer circuit 14 at a time t0 when the PMOS transistor 3 is turned on. However, here, the timer circuit 14 does not start the time count, and the overheat protection circuit 20 is not started up either.

At a time t1 when the PMOS transistor 3 is turned off, a control signal turning off the PMOS transistor 3 outputted from the output control circuit 15 is inputted simultaneously to the timer circuit 14. In response to the signal, the timer circuit 14 is turned on to start the time count. At this time, the timer circuit 14 outputs a control signal to the overheat protection circuit 20 to turn on the overheat protection circuit 20.

When a time tc after a count time from a time t1 is reached, the timer circuit 14 outputs a signal to the overheat protection circuit 20 to turn off the overheat protection circuit 20.

When a time t2 after the switching cycle from the time t0 is reached, the PMOS transistor 3 is turned on by the control signal outputted from the output control circuit 15, but the timer circuit 14 does not start the time count, and the overheat protection circuit 20 is not started up either.

In the third operation example as described above, since the timer circuit 14 continues to repeat on and off in a manner similar to the second operation example, the overheat protection circuit 20 is brought into the intermittent operating state, so that the power consumption of the overheat protection circuit 20 can be reduced as compared with the first operation example.

In FIG. 6B in which the load becomes light, the switching regulator is transitioned to a discontinuous mode operating state in which a fluctuation in the output voltage Vout becomes small, and the operation of the PMOS transistor 3 does not assume an oscillation operation of a prescribed cycle, and the switching frequency in the discontinuous mode operating state is decreased.

In a manner similar to the continuous mode operating state even in the discontinuous mode operating state, the timer circuit 14 does not start the time count at a time t0 when the PMOS transistor 3 is turned on, and the overheat protection circuit 20 is not started up either. At a time t1 when the PMOS transistor 3 is turned off, the timer circuit 14 starts the time count to turn on the overheat protection circuit 20. At a time tc after a timer time, the overheat protection circuit 20 is turned off. Thus, the overheat protection circuit 20 is operated intermittently.

In a manner similar to the second operation example, the third operation example in the first embodiment is capable of expecting a power consumption reduction effect higher than that in the first operation example by intermittently operating the overheat protection circuit 20 both in the continuous mode operating state/discontinuous mode operating state. Therefore, it can be said that this is an operation example preferable for the switching regulator in which in a continuous operation mode, no large current is required and an overheat state is not so much apprehended.

FIG. 7 is a timing chart of the timer circuit 14 for realizing the third operation example of the switching regulator according to the first embodiment.

The pulse generation circuit 41 generates an L pulse with the off operation of the PMOS transistor 3 as a trigger. By doing so, the capacitors 46 and 48 are discharged at a time t0 when the PMOS transistor 3 is turned off, and from there the timer circuit 14 is able to start the time count.

Figure 8:
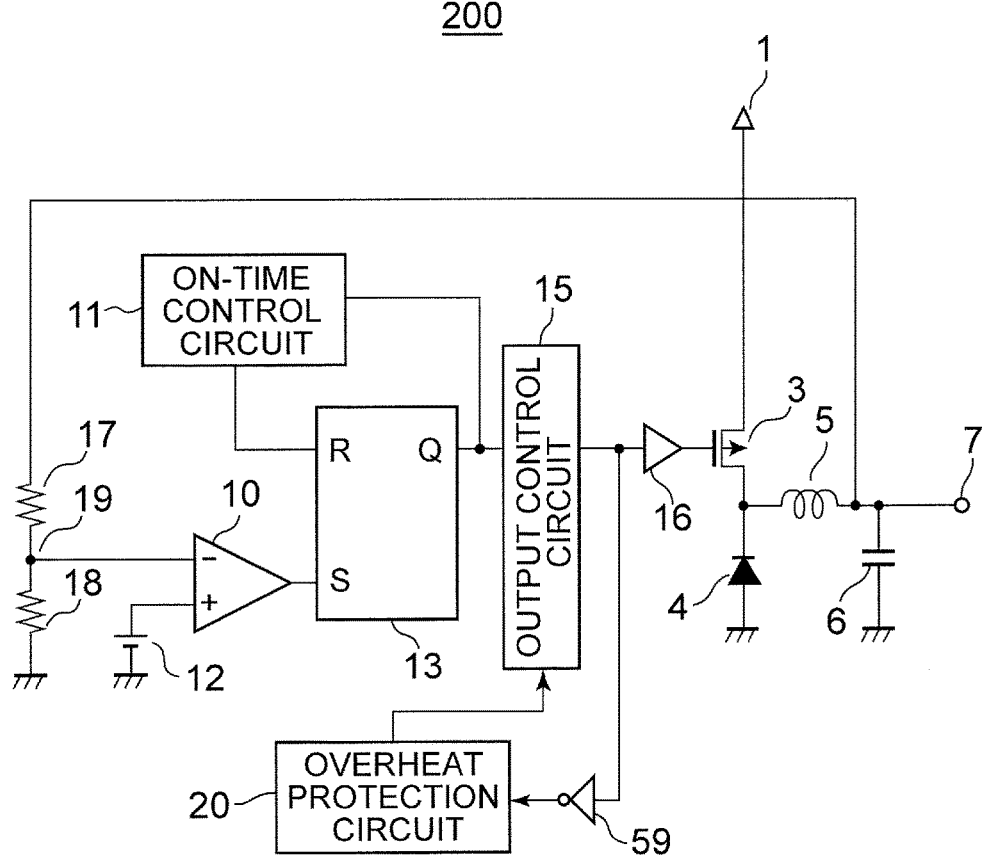
FIG. 8 is a circuit diagram illustrating one example of a switching regulator according to a second embodiment of the present invention.

FIG. 8 is a diagram illustrating a circuit example of a switching regulator according to a second embodiment. In the second embodiment, the timer circuit 14 is not used therein as compared with the first embodiment, and the operation of an overheat protection circuit 20 is synchronized with the timing to turn on a PMOS transistor 3. In the present embodiment, when an L signal operating the PMOS transistor 3 being a switching element is outputted from an output control circuit 15, the L signal is inverted by an inverter 59 and inputted to the overheat protection circuit 20 as an H signal.

When such an intermittent operation as to operate the overheat protection circuit 20 when the PMOS transistor 3 is off and stop it when the PMOS transistor is on is performed, it can be realized by removing the inverter 59.

Further, there is also considered a case where overheat protection is performed for a limited time within the time when the PMOS transistor 3 is off.

Since the overheat protection circuit 20 is always operated only when the PMOS transistor 3 is in the on state or in the off state even in both the continuous mode operating state and discontinuous mode operating state as described above, the switching regulator according to the second embodiment is capable of enhancing a power consumption reduction effect more than in the embodiment/operation examples which have been described earlier. Further, since the timer circuit is not required, a circuit area can be reduced, and a cost reduction effect can also be obtained.

On the other hand, in the first embodiment, the overheat state at the time that the operation of the switching element does not depend on the state of on/off can also be determined by using the timer circuit 14. Therefore, the present embodiment is suitable for providing the switching regulator which is high in the degree of freedom that a rise in the temperature of a semiconductor integrated circuit when being in various states such as the distance between the switching element as a large heat generation source and the overheat protection circuit 20 being separated due to the restriction of a layout or the like can be sensed, and which is high in safety. At which point in time is taken as the trigger and to what timing the overheat protection circuit 20 is operated can be adjusted by a trigger for outputting a pulse from the pulse generation circuit and a pulse width thereof. It is needless to say that the count time of the timer circuit 14 can be arbitrarily set by changing the capacitors, Vth and the current value of the bias circuit.

Figure 9:
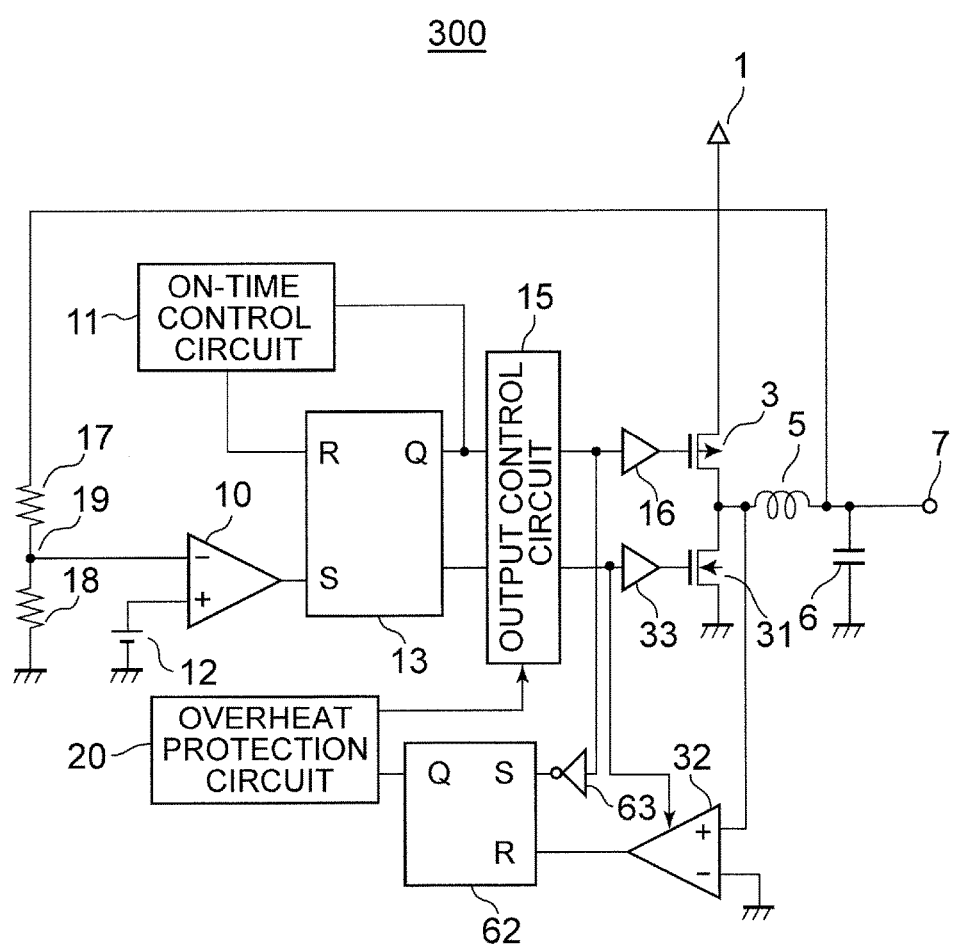
FIG. 9 is a circuit diagram illustrating one example of a switching regulator according to a third embodiment of the present invention.

FIG. 9 is a diagram illustrating a circuit example of a synchronous rectification switching regulator according to a third embodiment. As an alternative to the diode 4 which causes the current to flow through the inductor 5 when the PMOS transistor 3 is off, an NMOS transistor 31 being a switching element which performs a switching operation contrary to the PMOS transistor 3 is used, and a buffer circuit 33 which drives the NMOS transistor 31 is provided.

Also, an output control circuit 15 is equipped with an output terminal for controlling the NMOS transistor 31 through the buffer circuit 33 in addition to an output terminal for controlling the PMOS transistor 3 through a buffer circuit 16.

Further, there is provided a backflow detection circuit 32 which when the generation of a reverse current flowing from the output terminal 7 to the NMOS transistor 31 or an indication of its generation is detected, outputs a signal forcibly turning off the NMOS transistor 31 to the output control circuit 15. The backflow detection circuit 32 is turned on only for a period in which the NMOS transistor 31 is on, to start its detection operation. When the NMOS transistor 31 is off, the backflow detection circuit 32 is synchronously turned off to stop its detection. In order to realize such a series of operations, there is provided a configuration in which the output signal on the NMOS transistor 31 side, of the output control circuit 15 is inputted to the backflow detection circuit 32. The turning on and off of the backflow detection circuit 32 is switched based on the output signal.

An RS-FF circuit 62 outputs an H signal when an H signal obtained by inverting an L signal of the output control circuit 15 turning on the PMOS transistor 3 side by an inverter 63 is inputted to a set terminal S. Further, when an H signal of the backflow detection circuit 32 is inputted to a reset terminal R, the RS-FF circuit 62 outputs an L signal.

In response to the output signal of such an RS-FF circuit 62 as described above, an overheat protection circuit 20 is operated when either of the PMOS transistor 3 and the PMOS transistor 31 is on or for a time from the turning on of the PMOS transistor 3 to the turning off of the PMOS transistor 31, and is stopped when the PMOS transistor 3 and the PMOS transistor 31 are both off. Of course, it is needless to say that the overheat protection circuit 20 is capable of setting operations at various timings by suitably changing the inverters connected to the inputs of the set terminal S and reset terminal R of the RS-FF circuit 62.

What is claimed is:

1. A switching regulator outputting a desired output voltage to an output terminal by a switching element from a power supply voltage inputted to an input terminal, comprising:
   an error comparator which monitors the output voltage;
   an output control circuit which outputs a control signal to a gate of the switching element, based on an output signal of the error comparator; and
   an overheat protection circuit comprising an input electrically coupled to an output of the output control circuit, wherein the input receives a signal based on the control signal output from the output control circuit, the overheat protection circuit configured to operate intermittently such that the overheat protection circuit is turned on during a prescribed period and is turned off during a time outside of the prescribed period, and when a prescribed temperature or more is reached, output a signal to the output control circuit to turn off the switching element.

2. The switching regulator according to claim 1, wherein the prescribed period is a period in which at least the switching element is on.

3. The switching regulator according to claim 2, comprising a timer circuit which outputs the signal based on the control signal output for intermittently operating the overheat protection circuit.

4. The switching regulator according to claim 1, comprising a timer circuit which outputs the signal based on the control signal output for intermittently operating the overheat protection circuit during the prescribed period.

* * * * *